United States Patent [19]
Guiraud

[11] Patent Number: 5,226,103
[45] Date of Patent: Jul. 6, 1993

[54] CABLE PROVIDED WITH A DEVICE FOR DESTROYING THE OPTICAL FIBERS OF THIS CABLE

[75] Inventor: Marc H. Guiraud, Merindol, France
[73] Assignee: Commissariat A L'Energie Atomique, Paris, France
[21] Appl. No.: 831,988
[22] Filed: Feb. 6, 1992
[30] Foreign Application Priority Data
  Feb. 12, 1991 [FR] France ............... 91 01605
[51] Int. Cl.⁵ ............................................. G02B 6/44
[52] U.S. Cl. ......................... 385/100; 385/115; 385/116; 385/102
[58] Field of Search ............... 385/100, 101, 102, 103, 385/115, 116, 126, 128

[56] References Cited
U.S. PATENT DOCUMENTS

| | | | |
|---|---|---|---|
| 3,749,487 | 7/1973 | Grier et al. | 385/116 X |
| 4,178,069 | 12/1979 | Andersen et al. | 385/128 |
| 4,314,741 | 2/1982 | Deminet et al. | 385/100 X |
| 4,688,891 | 8/1987 | Carratt et al. | 385/115 |

FOREIGN PATENT DOCUMENTS
2842077 4/1980 Fed. Rep. of Germany .

Primary Examiner—John D. Lee
Assistant Examiner—Ryan Heartney
Attorney, Agent, or Firm—Oblon, Spivak, McClelland, Maier & Neustadt

[57] ABSTRACT

Optical cable provided with a device for destroying the optical fibers of this cable. This cable includes a bundle of optical fibers (4) and a device for destroying the optical fibers, this device operating when sectioning the bundle of optical fibers (4) at virtually any location of the cable (2) and destroying the fibers. This device may include a tube (6) filled with a substance able to destroy the fibers via having contact with the latter, the tube being resistant to this substance and housed in the bundle of fibers. Application for the detection of an intrusion or attempted intrusion into a security system using an optical cable.

9 Claims, 1 Drawing Sheet

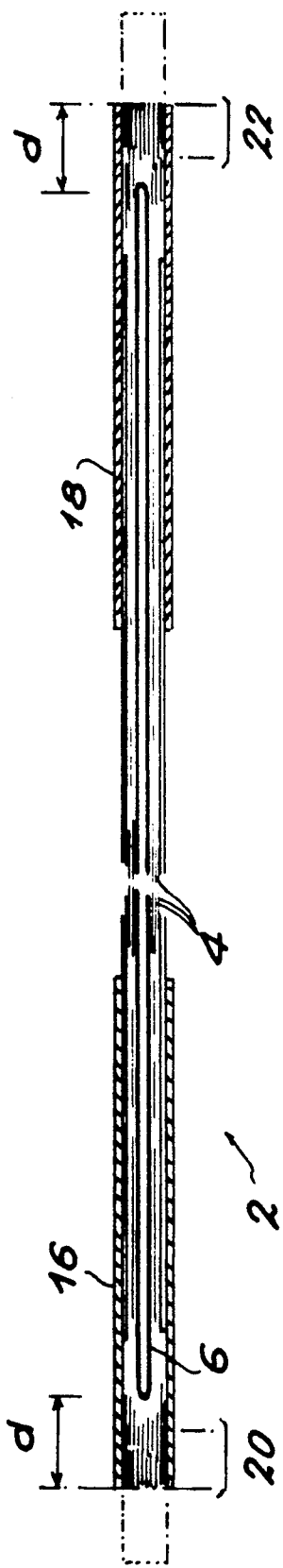
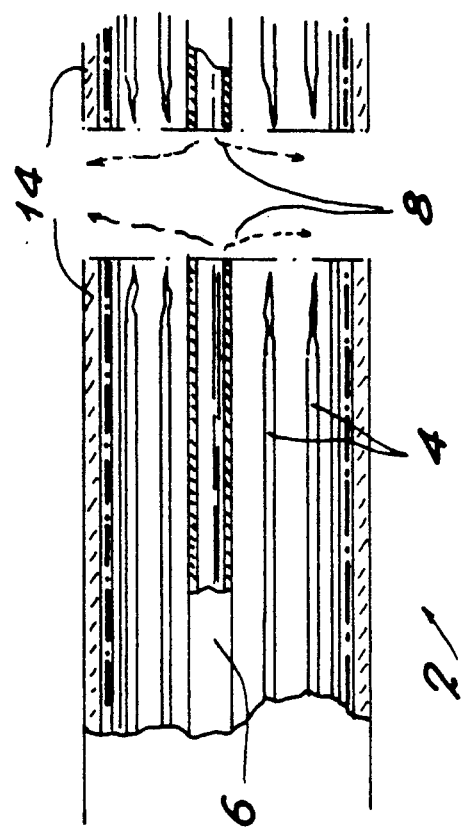
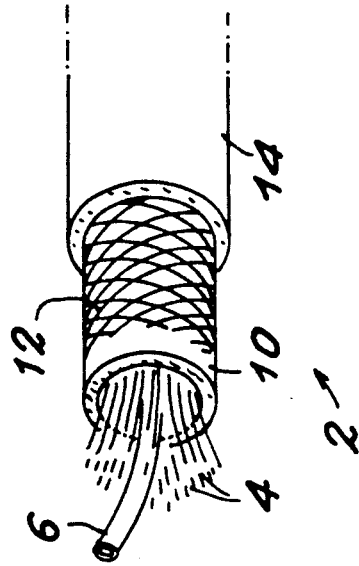

5,226,103

CABLE PROVIDED WITH A DEVICE FOR DESTROYING THE OPTICAL FIBERS OF THIS CABLE

FIELD OF THE INVENTION

The present invention concerns optical cables.

BACKGROUND OF THE INVENTION

The invention is applicable to any security system using an optical cable, such as a system for transmitting confidential information by means of optical fibers or an optical cable system able to seal a container.

This type of sealing system is described in the document EP-A-0147328, known subsequently as "document I", and in the document U.S. Pat. No. 4,688,891, reference to be made to these documents later in this text.

The users of a security system using an optical cable are able to detect any intrusion or attempted intrusion into this system.

The system described in the document I is intended to detect any break-in or attempted break-in in order to steal all or part of the contents of the container sealed by this system.

In order to do this, images, respectively taken immediately after sealing of the container and during a subsequent inspection, are compared with an image transmitted by the optical fibers of the cable comprising the system when these fibers receive a luminous beam.

If the images differ, it is assumed that there has been an infraction or attempted infraction between the time when the container has been sealed and the time of inspection.

However, considerable progress achieved in the field of the butt welding of optical fibers is rendered ineffective as, by using the light transmitted by the cable fibers, it becomes extremely difficult to detect this intrusion or attempted intrusion, which is almost completely concealed.

SUMMARY OF THE INVENTION

The object of the present invention is to resolve the following problem ; given the fact that an optical cable would have been cut, it is almost impossible to carry out the "invisible" repair of this cable, in other words carry out a repair unable to be visible by using light transmitted by the optical fibers of the cable.

So as to resolve this problem, the optical cable of the invention including a bundle of optical fibers and a device for destroying the optical fibers, which becomes effective when sectioning the bundle of optical fibers at almost any location of the cable and which destroys the fibers, is characterized in that the destruction device includes:

an elongated reservoir housed in the bundle of optical fibers and which extends along this bundle, and a substance contained in the reservoir and able to destroy the optical fibers when it is in contact with the latter, the reservoir being made of a material resistant to the substance, with the result that, by sectioning the bundle of optical fibers at any location of the optical cable, the reservoir is also sectioned, the substance escapes and destroys the optical fibers.

Because of this, the checking image (taken at the time of a subsequent control) becomes different from the image taken immediately after sealing.

Furthermore, the invention is extremely simple to implement.

The reservoir may be a tube closed at its two extremities.

The extremities of the reservoir may be standing back with respect to the corresponding extremities of the bundle of optical fibers.

This is particularly effective in the system described in document I with the result that the presence of the reservoir on the initial image is unable to be seen, this image being taken immediately after the container has been sealed.

The optical cable of the invention may also include two cable markers which respectively tightly surrounds the extremities of the bundle of optical fibers.

The extremities of the reservoir are then able to be respectively situated inside these cable markers.

The cable may also include at least one sheath casing the bundle of optical fibers and which is also able to be destroyed by the substance.

Finally, it is possible to use polymethylmethacrylate optical fibers and, in this instance, the reservoir may be made of a chloride and vinyl acetate copolymer and may be filled with chloroform.

It is also possible to use silica optical fibers able to be attacked by fluorhydric acid and, in this case, the reservoir may be made of pure quartz (not able to be attacked by fluorhydric acid) or of hexafluoropropylene and vinylidene based rubber and may be filled with fluorhydric acid.

BRIEF DESCRIPTION OF THE DRAWINGS

The present invention shall be more readily understood from a reading of the following embodiments, given purely by way of information of non-restrictive examples, with reference to the accompanying drawings on which:

FIG. 1 is a diagrammatic longitudinal cutaway view of one particular embodiment of the optical cable of the invention, FIG. 2 is an exploded perspective view of the cable shown on FIG. 1, and FIG. 3 shows a local destruction of this cable.

DETAILED DESCRIPTION OF THE PREFERRED EMBODIMENTS

FIG. 1 shows a diagrammatic longitudinal cutaway view of the optical cable 2 and FIG. 2 shows a perspective exploded view of the same cable. This cable includes a bundle of optical fibers 4 inside which a tube 6 is housed forming a reservoir closed at its two extremities.

This tube 6 is filled with a substance 8 (FIG. 3) able to destroy the fibers 4 when it is in contact with these fibers.

The tube 6 is made of a material able to resist this substance, that is a material unable to be destroyed by this substance.

The optical cable 2 also includes a protective sheath 10 containing the bundle of fibers 4 and which is able to be reinforced by a metallic covering 12.

The protective sheath 10 may be housed in another sheath 14.

The sheaths 10 and 14 may be made of a material the substance 8 is able to destroy.

It is possible to use as a substance a liquid able to dissolve the fibers 4 upon the slightest contact.

By considering that the cable 2 is disposed radially, the tube 6 may be disposed along the axis of the bundle of fibers 4 or parallel to this axis or even form an angle with this axis.

The tube 6 extends over the entire length of the bundle of optical fibers 4.

However, in certain embodiments, as the cable used in the system according to document I, it is preferable that the extremities of the tube 6 be stood back by a value d, for example equal to 5 mm, from the corresponding extremities of the bundle of optical fibers 4, the result being that it is impossible to see how the tube 6 is placed.

Naturally, the diameter of the tube is sufficient so that the liquid is able to escape from it at the time the tube is sectioned.

The cable 2 may be provided with lengthening pieces 16 and 18, Possibly metallic, which tightly enclose the extremities of the bundle of optical fibers 4 and the sheath 14 on each side of the cable.

At each extremity of the bundle of fibers 4, the extremities of these fibers are inside a given plane known as the "optical plane".

In the example shown on FIG. 1, it can be seen that each optical plane is situated at the level of the extremity of the corresponding lengthening piece.

In the system described in document I, it is the lengthening pieces 16 and 18 which would be inserted in the sealed body which this system comprises.

All the solvents do not fully destroy all the optical fibers and any material does not necessarily resist any solvent.

There are preferential sets of fibers4/solvent8/tube material 6.

By way of example, P.M.M.A. (polymethylmethacrylate) fibers 4 are used, a Tygon tube 6 (registered trademark), which is a vinyl acetate and chloride copolymer, and chloroform is used as a solvent 8.

By way of indication and being non-restrictive, the following is used:

a bundle of 64 PMMA fibers whose length is 500 mm and the diameter of these fibers being equal to 0.25 mm, a tube forming a Tygon reservoir (registered trademark) with a length of 450 mm, an outer diameter of 1.52 mm and an internal diameter 0.51 mm and which contains the chloroform, the sheaths 12 and 14 are made of a plastic material able to be dissolved by the chloroform, are 455 mm long and have an internal diameter of 3.5 mm and an external diameter of 4 mm, the lengthening pieces are made of blackened brass, have a length of 50 mm, an internal diameter of 4 mm and an external diameter of 5 mm.

So as to produce the optical cable 2 corresponding to the details supplied above by way of non-restrictive indication, firstly the bundle of the 64 optical fibers is prepared by providing a length of more than 500 mm for these fibers, which shall make it possible to subsequently section them so as to form the optical planes.

Next, the tube forming a reservoir is prepared.

In order to do this, it is filled with chloroform by means of a 20 ml syringe.

Next, a first extremity of the tube is welded by means of a soldering iron over a length of several mm; then the second extremity is welded with the aid of a soldering iron at a distance of 490 mm with respect to the location of the first weld.

The tube forming a reservoir is then placed in the bundle of optical fibers so that its welds are respectively 5 mm from the extremities of the bundle of fibers (when the optical planes are formed; then the sheaths are placed.

Then the lengthening pieces are mounted at the extremities of the bundle and are clamped with a suitable clamp.

The free zones of each lengthening piece are then filled with a silicon resin, such as Rhodorsil RTV 147 A resin (drying time:24 hours).

Next, the fibers are sectioned, for example by means of a razor blade by using the corrected faces of the lengthening pieces.

Instead of using P.M.M.A. fibers, it is possible to use silica fibers able to attacked by fluorhydric acid, a Viton tube (registered trademark) made of vinylidene and hexafluoropropylene based-rubber or pure quartz, this tube being filled with fluorhydric acid and welded at its two extremities.

There now follows a description of a security system which includes the optical cable 2 and which, for example, is a sealing system of the described in document I, or a system for transmitting confidential information by means of optical fibers.

In both these cases, an intrusion or attempted intrusion into the system means a cutting of the bundle of optical fibers 4 (in the first case, so as to open the container, and in the second case for installing an optical drift).

Then, the intruder, who a priori ignores the position of the tube 6 forming a reservoir, cuts not only the fibers 4 but also the tube, the solvent 8 then escaping from it and dissolving the extremities of the fibers resulting from cutoff and located close to the latter (FIG. 3).

It is then almost impossible to discretely reestablish the optical continuity of the cable.

In the first case (sealing system), the intrusion shall be firmly established by comparing an image of one extremity of the bundle of fibers taken immediately after sealing with the image of the extremity taken after the intrusion.

In the second case (transmission system), it could be possible to observe the appearance of an additional optical attenuation due to the installation of the optical drift or the welds when this drift would have been removed and when optical continuity of the cable has been re-established.

In fact, the repair of the cable requires that firstly the portions of the damaged fibers be removed by the solvent and then of suitably rewelding the fibers to one another, this being easily observed by a controller and which in any event would take a large amount of time, being all the more when there are more optical fibers.

I claim:

1. An optical cable including a bundle of optical fibers and a device for destroying the optical fibers which acts when sectioning the bundle of optical fibers at almost any location of the cable and which destroys the fibers, wherein the destruction device includes:

an elongated reservoir housed in the bundle of optical fibers and which extends along this bundle, and a substance contained in the reservoir and able to destroy the optical fibers when the substance is in contact with the optical fibers, the reservoir being made of a material able to resist the substance, so that by sectioning the bundle of optical fibers at any location of the optical cable, the reservoir is also sectioned, the substance escapes from the reservoir and destroys the optical fibers.

2. An optical cable according to claim 1, wherein the reservoir is a tube closed at its two extremities.

3. An optical cable according to claim 1, wherein the extremities of the reservoir stand back with respect to the corresponding extremities of the bundle of optical fibers.

4. An optical cable according to claim 1, wherein it further includes two lengthening pieces respectively encompassing the extremities of the bundle of optical fibers.

5. An optical cable according to claim 4, wherein the extremities of the reservoir are respectively situated in the lengthening pieces.

6. An optical cable according to claim 1, wherein it further includes at least one sheath envelopping the bundle of optical fibers and which is also able to be destroyed by the substance.

7. An optical cable according to claim 1, wherein the optical fibers are made of polymethylmethacrylate, wherein the substance is chloroform and wherein the material of which the reservoir is made is a vinyl acetate and chloride copolymer.

8. An optical cable according to claim 1, wherein the optical fibers are made of silica able to attacked by fluorhydric acid, wherein the substance is fluorhydric acid and wherein the material of which the reservoir is made is pure quartz.

9. An optical cable accoridng to claim 1, wherein the optical fibers are made of silica able to be attacked by fluorhydric acid, wherein the substance is fluorhydric acid and wherein the material of which the reservoir is made is hexafluoropropylene and vinylidene-based rubber.

* * * * *